United States Patent
Cho

(10) Patent No.: US 6,689,420 B2
(45) Date of Patent: Feb. 10, 2004

(54) METHOD FOR ACHIEVING ORNAMENTAL DISPERSION OF PARTICLES IN A RESIN MOLDED ARTICLE

(76) Inventor: Keuk-Lae Cho, 279-12 11/5 Youngju 2-dong, Joong-ku, Pusan 600-112 (KR)

( * ) Notice: Subject to any disclaimer, the term of this patent is extended or adjusted under 35 U.S.C. 154(b) by 148 days.

(21) Appl. No.: 09/994,685

(22) Filed: Nov. 28, 2001

(65) Prior Publication Data

US 2002/0053751 A1 May 9, 2002

Related U.S. Application Data

(63) Continuation-in-part of application No. 09/319,723, filed on Jun. 11, 1999, now abandoned.

(30) Foreign Application Priority Data

Dec. 18, 1996 (KR) .............................. 96-71112

(51) Int. Cl.[7] .................................................. B05D 5/06
(52) U.S. Cl. ....................... 427/240; 427/277; 427/346; 427/355
(58) Field of Search ................................ 427/240, 277, 427/346, 355

(56) References Cited

U.S. PATENT DOCUMENTS 5,198,159 A * 3/1993 Nakamura et al. .......... 264/401
5,368,902 A * 11/1994 Todd et al. .................. 427/601

* cited by examiner

Primary Examiner—Stephen J. Lechert, Jr.

(57) ABSTRACT

The present invention provides a method and apparatus for achieving ornamental dispersion of particles in a molded article thereby increasing the ornamental desirability of the article. The method for achieving ornamental dispersion of small planar particles in a resin molded articles comprises the steps of preparing a basic plate with any patterns engraved therein, pouring moldable fluid resin mixed with small planer particles into the patterns engraved in the plate, shaking the plate in circular vibration, hardening the resin and grinding the surface of the plate. When the patterns are is filled with a fluid resin material to which planar particles have been added, the action of the apparatus serves to ornamentally disperse the particles within the fluid resin while maintaining a pearl-like dispersion of each particle until the resin has set.

2 Claims, 2 Drawing Sheets

METHOD FOR ACHIEVING ORNAMENTAL DISPERSION OF PARTICLES IN A RESIN MOLDED ARTICLE

This application is a CIP of Ser. No. 09/319,723 filed Jun. 11, 1999, now abandoned.

FIELD OF THE INVENTION

The present invention is directed to an ornamental design technology, in particular to a method and apparatus for dispersing small planar pearl particles within moldable fluid resin for production of various resin-molded articles such as picture or ornamental frames.

BACKGROUND OF THE INVENTION

Many conventional techniques to ornamentally disperse planar pearl particles like mica fragments within moldable fluid resins have been known. For example, conventional techniques such as a spinning wheel method or dropping method are usually used to form an ornamental dispersion. The resulting dispersion is only simple and pre-fabricated to utilize it for various goods.

These conventional techniques have been used to disperse the planar particles in the resin-molded articles but the dispersion of planar particles was imperfect. Therefore, a high value-added article was not capable of being produced from the standpoint of the design or decoration of articles.

SUMMARY OF THE INVENTION

The present invention provides a method and apparatus which fixes a dispersion of planar particles mixed with fluid materials in any pattern.

The method for dispersing small planar particles within moldable fluid resin for production of various molded articles comprises the steps of preparing a basic plate with any patterns engraved therein, pouring moldable fluid resin mixed with small planer particles into the patterns engraved in the plate, shaking the plate in circular vibration, hardening the resin and grinding the surface of the plate. Thus, a curious dispersion of pearl-like planar particles is achieved in the engraved patterns of the plate.

The apparatus for ornamentally dispersing small planar particles within moldable fluid resin for production of various molded articles comprises a body; a shaft vertically mounted on the body; an eccentricity means connected to the shaft for generating circular vibration; a pipe at least partially surrounding the shaft; a article holding frame connected to the pipe for holding articles to be vibrated circularly; and a driving means for rotating the shaft, wherein the shaft is to be rotated and the pipe is to be vibrated circularly by the eccentricity means and then the article holding frame is to be vibrated circularly.

The design that is resin-molded in the engraved pattern and in which the planar particles are ornamentally dispersed by the present invention looks curiously light-reflective like a pearl or a jewel.

| | |
|---|---|
| 1 | body |
| 1' | rigid body |
| 2 | drive mechanism |
| 2' | shaft |
| 2" | eccentric portion |
| 3 | metal bearing |
| 3' | dynamic bearing |
| 3" | pipe |
| 3'" | oil space |
| 4 | article holding frame |
| 5 | article space |
| 6 | damper |
| 7 | changing speed motor |
| 7' | pulley |
| 8 | driven pulley |
| 8' | driven pulley |
| 9 | belt |
| 9' | belt |

DETAILED DESCRIPTION OF THE INVENTION

The present invention will now be described in detail with reference to the accompanying drawings.

Figure 1:
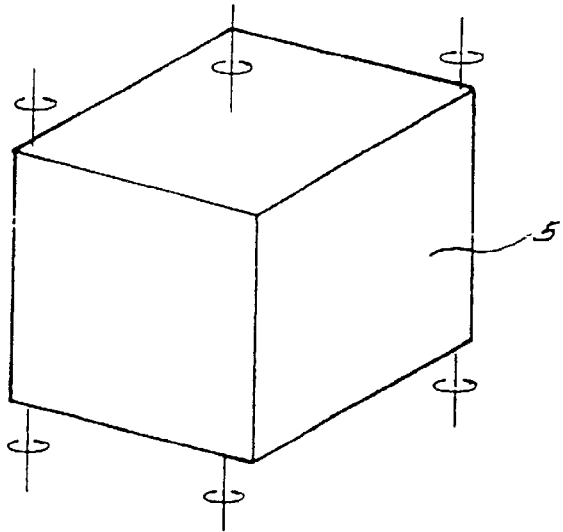
FIG. 1 is a schematically shown drawing of the circular vibration applied to a frame by the apparatus.

FIG. 1 provides schematically a representation of an example of the circular vibration of the article space 5 with moldable fluid resin poured plate therein. The liquid resin is mixed with small planar pearl particles such as mica fragments.

This apparatus is to ornamentally disperse the small planar particles within moldable fluid resin poured into any patterns engraved in a basic plate for production of various molded articles such as picture or ornamental frames. First of all, the basic plate with any patterns engraved therein is prepared. Then, moldable fluid resin mixed with small planer particles such as mica fragments is poured into the patterns engraved in the plate. Thereafter, the plate is shaken in circular vibration in order to ornamentally disperse the small planar particles in the resin. The resin is hardened and the surface of the plate is grinded. Thus, an ornamental frame with pearl particles dispersed ornamentally is made.

In the present invention, the following three conditions are necessarily satisfied.

The first condition is that the diameter of the circular vibration of the article holding frame must be controlled suitably according to the size and thickness of the pattern engraved in the basic plate. The larger pattern size is, preferably the larger the vibration diameter is.

The second condition is that the revolutions per minute of the shaft to generate the circular vibration of the article holding frame must be suitably controlled in accordance with the first condition and with the viscosity of the liquid resin.

The third condition is that any vertical vibrations conflicting with the circular vibration of the frame must be eliminated.

And a condition in which the direction of the virtual axis of the circular vibration of the article holding frame may be controlled suitably according to the size and thickness of the pattern engraved in the basic plate is optionally required.

Figure 2A:
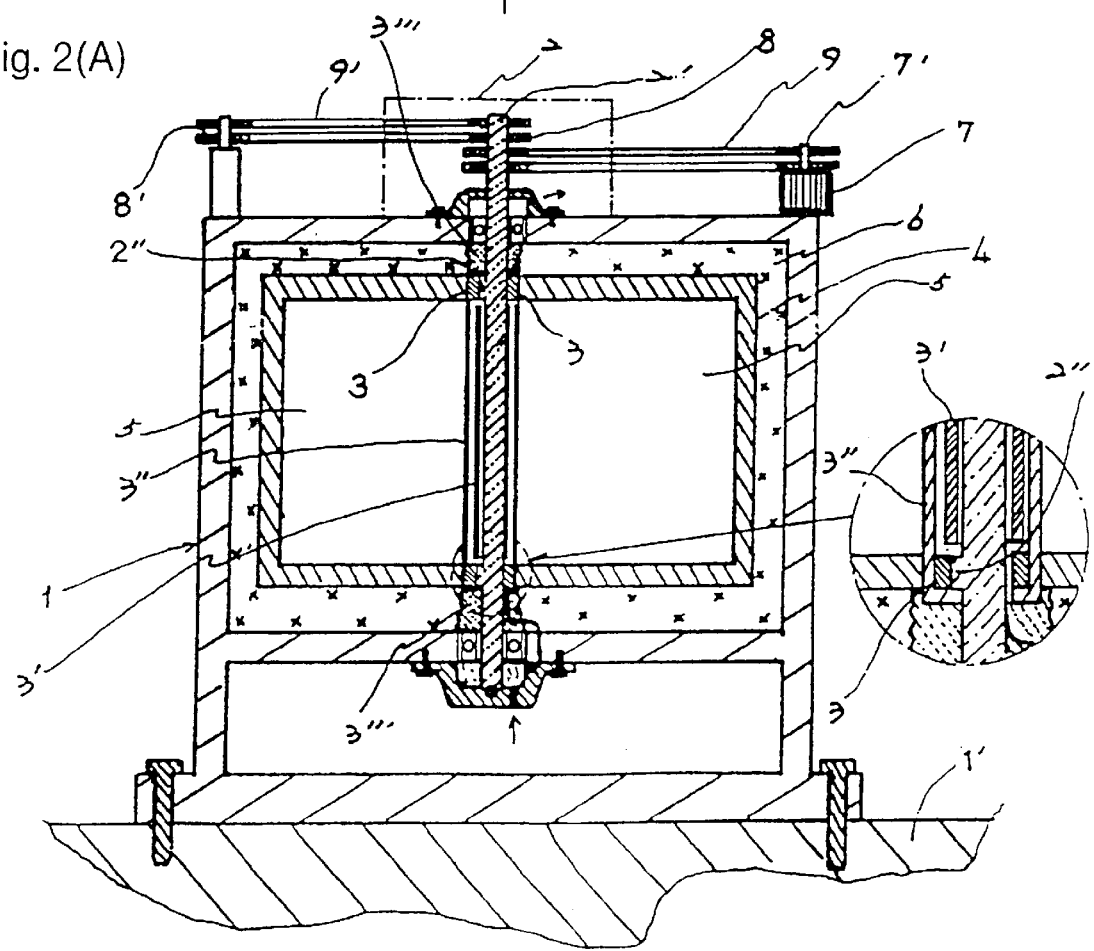
FIG. 2(A) is a vertical cross section of a first embodiment of the apparatus.
Figure 2B:
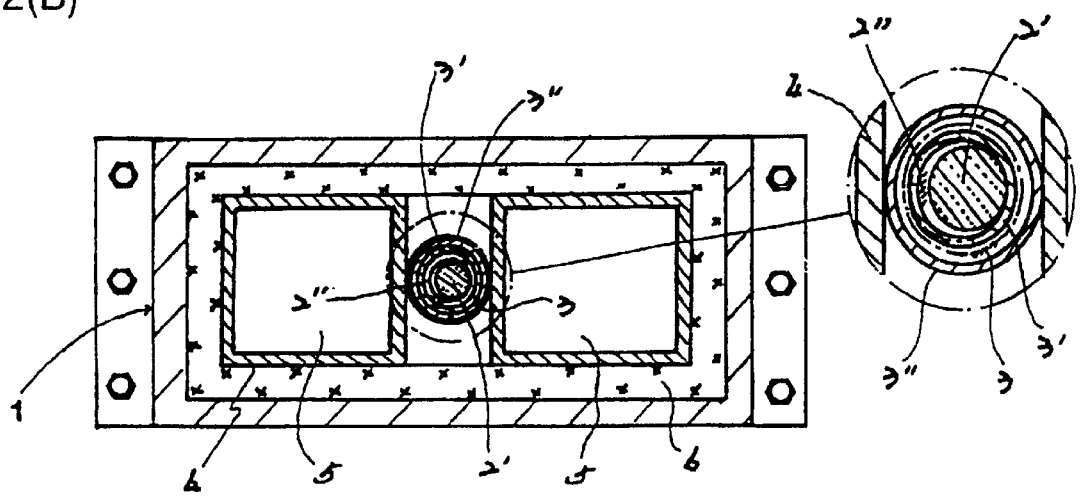
FIG. 2(B) is a horizontal cross section of the apparatus of FIG. 2(A).

A vertical section of the apparatus of the preferred embodiment of the invention is represented in FIGS. 2(A) and 2(B). The apparatus comprises a body 1 mounted on a rigid body 1', a circular shaft 2' which is installed in the middle of the body 1, an eccentric portion 2" which is projected from the shaft 2', and a drive mechanism 2 comprising a speed changing motor 7, pulleys 7', 8 and 8', and drive belts 9 and 9' which are provided on top of the body 1. The apparatus further comprises a metal bearing 3 in abutment of the eccentric portion 2", a dynamic bearing 3' for shaft 2', a pipe 3" surrounding the bearings and the shaft 2', an oil space 3''' at the ends of the shaft 2'. The oil space 3''' is to store friction oil to reduce friction of friction portions. The eccentric portion 2" formed at the top and bottom of the circular shaft 2' is located in the pipe 3". An article holding frame 4 to hold the article space 5 is welded to the pipe 3". A damper 6 for elimination of vertical vibration is provided between the article holding frame 4 and body 1. The drive mechanism 2 can be substituted with an electric vibrator.

To make an ornamental frame with small planar particles dispersed within molded fluid resin using the above apparatus, first of all, a basic plate with any patterns engraved therein is prepared. Then, moldable fluid resin containing small pearl like planar particles is poured into the patterns engraved in the plates. And the plates are put into the article space 5 of the article holding frame 4. When the motor 7 drives the shaft 2' to be rotated by belts 9, the pipe 3" and the article holding frame 4 attached thereto are vibrated circularly by the rotating eccentric portion 2". After shaking the plate in circular vibration to disperse the pearl like fragments in the resin, the resin is hardened or cured. Then the surface of the plate is grinded.

The following observations relate to the results obtained by applying circular vibration to the plate resin molded into the engraved patterns thereon.

1. The diameter of the circular vibration of the frame 4 is equal to the distance of the eccentric portion 2" from the axis of the shaft 2'. In the damper condition which removes the vertical vibration, it is necessary to remove the vertical vibration to obtain the best quality of pearl particle dispersion.

2. In the case where the frequency of the circular vibration of the virtual center axis of the frame 4 is greater than or equal to 7200, a metal bearing may be used in order for the hydraulic bearing to be applied. In the case where the frequency is about 32,000, oil is necessarily injected into the metal bearing for cooling.

3. As for the viscosity of the resin materials, the amplitude of the vertical vibration which degrades the quality of the pearl dispersion should be decreased down to 0.01 m/m as the viscosity becomes low. And the frequency of the circular vibration should be increased as the viscosity becomes high.

4. With regard to the size and thickness of the patterns engraved in the plate, as the size and thickness increases, good dispersion of the planar particles is obtained even if the radius of circular vibration of the frame increases.

5. It is desirable to remove all of the vibration which is conflictive with the circular vibration of the frame 4. The vertical vibration phenomenon may be removed by attaching a damper 6 between the body 1 and the frame 4 as illustrated in FIG. 2A.

The apparatus is configured so that the diameter of the circular vibration of the frame and the frequency of the circular vibration of virtual center axis of the frame is controlled suitably according to the size of the patterns to be formed and the viscosity of resin in order to obtain good dispersion of the planar particles.

It is possible to obtain the best state of pearl dispersion if a device for increasing the frequency of circular vibration of the frame or a proper means for decreasing the viscosity is provided.

The present invention is very useful to obtain a value-added design and decoration of articles.

What is claimed is:

1. A method for achieving ornamental dispersion of small planar particles in a resin molded articles comprises the steps of preparing a basic plate with any patterns engraved therein, pouring moldable fluid resin mixed with small planer particles into the patterns engraved in the plate, shaking the plate in circular vibration, hardening the resin and grinding the surface of the plate.

2. The method according to claim 1, further comprising removing a vertical vibration of the plate in the step of shaking the plate.

\* \* \* \* \*